United States Patent [19]

Poteet et al.

[11] 4,278,482
[45] Jul. 14, 1981

[54] APPARATUS AND METHOD FOR PRODUCTION OF POLYURETHANE CARPET BACKING

[75] Inventors: William C. Poteet, Chatsworth; Claude E. Terry, Armuchee; Glen F. Hamrick, Tunnel Hill; Francis G. Walls, Dalton, all of Ga.

[73] Assignee: Custom Coating, Inc., Dalton, Ga.

[21] Appl. No.: 52,092

[22] Filed: Jun. 26, 1979

[51] Int. Cl.³ .......................................... B32B 31/20
[52] U.S. Cl. ...................... 156/78; 118/101; 118/102; 118/117; 118/118; 118/119; 118/123; 156/209; 156/220; 156/289; 156/324; 156/499; 156/582; 428/95; 428/218
[58] Field of Search .................. 156/77, 78, 209, 220, 156/289, 324, 499, 582; 428/95, 218; 118/101, 102, 117, 118, 123, 119

[56] References Cited

U.S. PATENT DOCUMENTS

| | | | |
|---|---|---|---|
| 2,950,221 | 8/1960 | Bauer et al. | 156/78 X |
| 4,022,643 | 5/1977 | Clark | 156/78 |
| 4,109,034 | 8/1978 | Welch | 427/355 |
| 4,132,817 | 1/1979 | Tillotson | 427/244 |

OTHER PUBLICATIONS

Vera Montgomery, "New Urethane Carpet Backing Technology", Carpet & Rug Industry, vol. 8, No. 3, (Mar. 1980), pp. 22-23.

Primary Examiner—David A. Simmons
Assistant Examiner—Robert A. Dawson
Attorney, Agent, or Firm—Newton, Hopkins & Ormsby

[57] ABSTRACT

A reactive polyurethane mixture is applied by a high pressure airless spray applicator directly onto the primary backing of a moving substrate such as a carpet web. The applied reactive mixture is allowed to foam to an approximate predetermined thickness and density. While the blown or foamed backing layer still possesses substantial residual tackiness, it is compressed or regauged to a precise uniform thickness and simultaneously is provided with either an embossed or a smooth surface. The tack of internal cell walls of the blown backing layer retains the layer at the regauged thickness. Curing of the regauged backing layer by externally applied heat and/or by the heat of the exothermic reaction in the applied mixture is completed. Detackifying agents are applied to the regauging devices and/or to the applied backing layer to prevent adherence of the layer to the regauging devices. A surface skin formed of the detackifying agents is cured on the regauged backing layer. The process achieves a great savings of energy and is fast and economical.

28 Claims, 10 Drawing Figures

APPARATUS AND METHOD FOR PRODUCTION OF POLYURETHANE CARPET BACKING

BACKGROUND OF THE INVENTION

The current energy crisis and the ever-present need for greater efficiency and economy in the carpet manufacturing industry have led this industry increasingly away from the use of water soluble foam latex as a cushion backing for carpet and other similar substrates. While foam latex forms a very satisfactory cushion backing for carpet, its processing consumes enormous quantities of energy necessary to drive the water out of the latex composition in the curing thereof. Furthermore, the traditional latex process is slow, with production rates in the range of 8 to 35 linear feet per minute being the best attainable rates. Such production rates are not economically satisfactory.

In view of the above, the carpet industry has turned increasingly to blown polyurethane as a cushion backing for carpet, with the reactant composition applied directly to the primary carpet backing in a continuous type process. Two types of polyurethane systems are known in the art. In one type, the polyurethane composition is mechanically foamed, while in the other type it is chemically foamed in situ. Once a chemical foam has been established, it is not possible to vary the foam density or thickness as it is with mechanical foaming systems, unless the basic constituents of the reactive composition are changed. Thus, the chemical foaming process lacks flexibility.

A further drawback in the use of blown polyurethane as a cushion backing for carpet is the great difficulty of providing surface smoothness and a uniform thickness to the blown polyurethane backing. Very minute stitching irregularities in the primary carpet backing can be magnified as much as thirty times in the blown backing layer. To overcome this, the industry has attempted to slow down the blowing and curing process so that doctoring and other surface leveling techniques can be carried out. Such practices have not been entirely successful. These prior art processes involved long periods of dwell time which resulted in a time consuming or slow production rate.

A further difficulty in the prior art arises as a result of a tendency for the polyurethane reactive mixture applicators and mixing devices to clog up to such an extent that they are rendered almost useless. If the reactive mixture is allowed to cure or harden in such applicator equipment, it is almost impossible to restore the equipment to a proper operating condition.

It is therefore the objective of this invention to alleviate all of the above and other deficiencies of the prior art relative to producing blown polyurethane backings directly on carpet or other like substrates. In general, the present invention overcomes the problems of the prior art by employing an improved formulation for the reactive polyurethane mixture and by utilizing an essentially non-clogging high pressure airless spray applicator or other suitable means of application for the mixture which has built-in flushing means and a small internal mixing chamber for the two or more components of the reactive mixture.

The essence or heart of the present invention which completely solves the most troublesome difficulty of the prior art in achieving thickness uniformity in the directly applied polyurethane backing layer is the following. At or near the end of the blowing cycle of the reactive composition and/or early in the curing cycle while the applied backing layer possesses substantial residual tackiness, it is subjected to compressive regauging of its thickness by the application thereto of a heavy mechanical compressive or crushing pressure, under which the tack of the internal cell walls of the polyurethane composition adhere and retain the backing layer at its regauged height or thickness permanently, and with a high degree of uniformity following completion of the cure cycle. In the compressive regauging of the polyurethane backing prior to its complete curing, either an embossed or a smooth external surface is imparted to the layer with high uniformity. A temporary or a permanent surface film or skin is or may be also produced on the cured cushion backing layer by the application of the detackifying agent or agents which are applied liberally to the layer and to the regauging means in order to prevent adherence of the incompletely cured material to the regauging equipment.

Other important features and advantages of the invention will become apparent during the course of the following description.

In both the patented and commercial prior art, a number of teachings pertaining to the direct application of reactive polyurethane compositions to the primary carpet backing have been set forth. One pertinent prior art teaching is contained in U.S. Pat. No. 4,132,817. This patent discloses a method of applying a blown polyurethane backing layer to a primary carpet backing. A reactive polyurethane mixture is applied to a conveyor belt on top of a pre-applied latex film on the belt. Blowing of the reactive mixture takes place under a controlled temperature. A preheated carpet web has its primary backing brought into surface-to-surface contact with the polyurethane material undergoing blowing, and pressure is applied to the carpet web for the purpose of shaping the polyurethane layer and to promote bonding thereof to the primary backing of the carpet. At the completion of curing, the united carpet web and cellular polyurethane backing layer are stripped from the conveyor belt. The apparatus employed in this patented process is rather complicated and excessively costly. The reactive polyurethane composition is not applied directly to the primary carpet backing but must be transferred from a supporting belt to the primary backing during the shaping operation which is extremely difficult to control because of the nature of the blowing process. The end result obtained by the patented process, in addition to being more costly, falls far short of the present invention in terms of quality and precision uniformity in the applied cushion backing.

A commercial prior art process, namely the ICI Polyurethane Carpet Backing Process of Rubicon ICI in West Germany, involves direct application of a reactive polyurethane mixture to the primary backing of carpet by means of traversing spray nozzles which are fed from stationary mixing heads. The moving carpet is preheated by infrared heaters. After blowing of the applied polyurethane layer, curing takes place within an oven having infrared heaters. Approximately five meters downstream from the curing oven, the product is subjected to the action of a heated embossing roller which produces a light embossment in the backing layer and improves the appearance of the product. The ICI commercial process fails to recognize that embossing of the polyurethane backing layer after the curing cycle or very late in such cycle renders it impossible to achieve the main advantages of the present invention in terms of surface smoothness and uniform thickness of the applied cushion backing regardless of variations in thickness of the backing during application because the walls of the internal cells of the blown backing have already lost their tackiness at the time they are acted on by the light embossing roller in the ICI process.

None of the known prior art suggests the essence of the invention set forth above, wherein the reactive polyurethane mixture may be applied evenly or somewhat unevenly to the primary backing of the carpet and subsequently regauged to a precision uniform thickness early in the cure cycle while the internal cell walls are still substantially tacky and adherent.

Additional prior art U.S. patents of general interest and which do not suggest the discussed novel features of the present invention are the following, which are made of record herein under 37 C.F.R. 1.56:

| | |
|---|---|
| 2,758,036 | 3,519,526 |
| 2,939,851 | 3,811,922 |
| 3,175,936 | 3,819,463 |
| 3,296,009 | 3,926,700 |
| 3,314,845 | 4,022,643 |
| 3,505,252 | 4,035,529 |
| 3,518,102 | 4,132,817. |

DETAILED DESCRIPTION

Figure 1A:
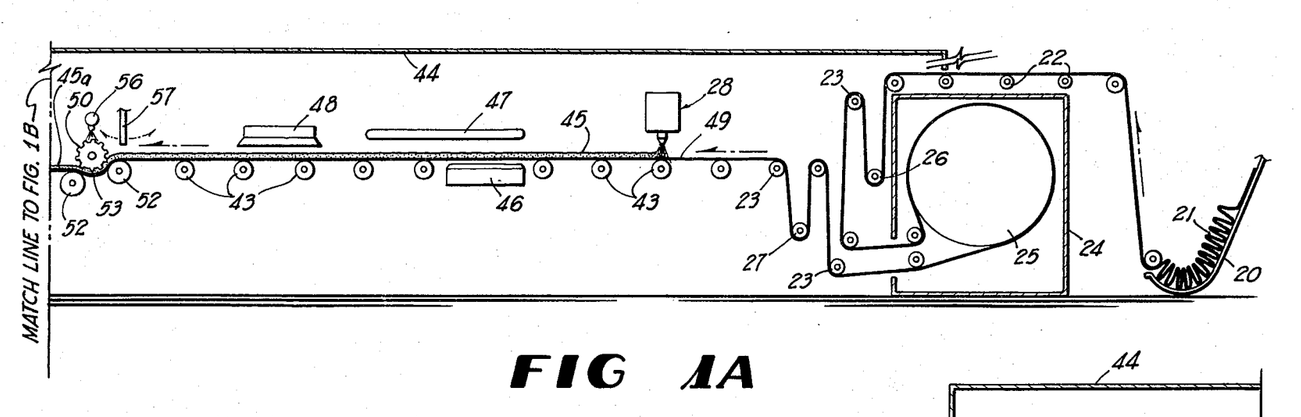
FIGS. 1A and 1B constitute a partly schematic side elevation, partly in cross section, of apparatus employed in the practice of the method.
Figure 1B:
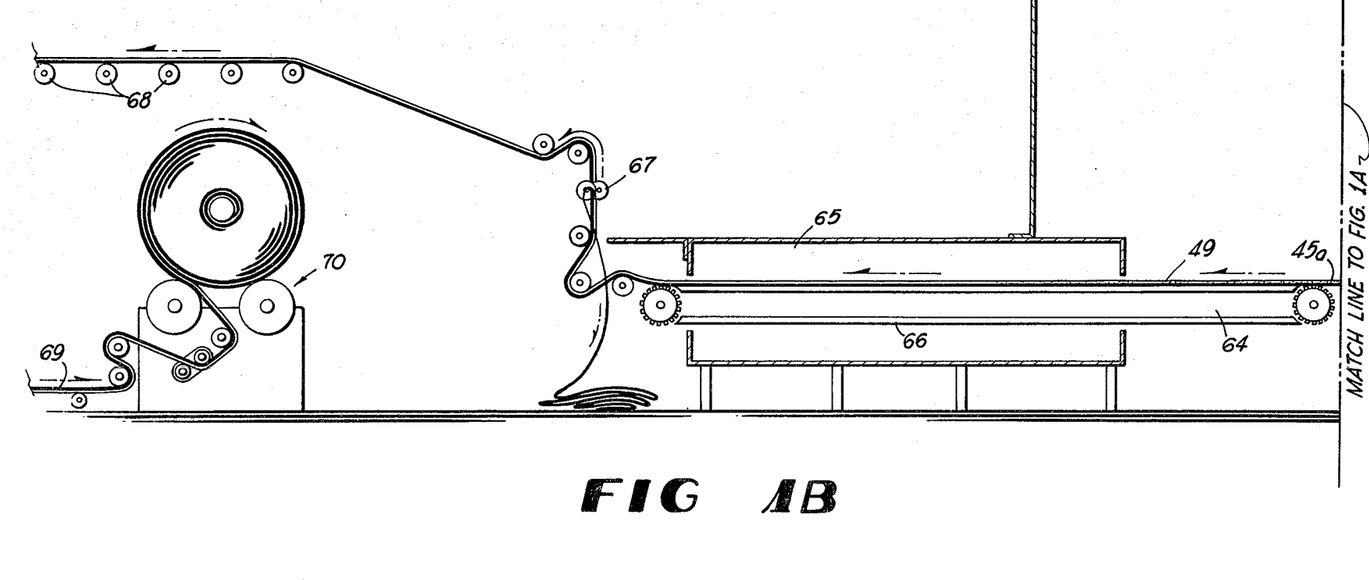

Referring to the drawings in detail, wherein like numerals designate like parts, the apparatus used in the practice of the method comprises in FIGS. 1A and 1B an input accumulator 20 for a carpet web 21 in the form of a J-box. From this accumulator, the carpet web 21 or other similar substrate is advanced in the direction of the arrows over a series of elevated guide rollers 22 and pulling rollers 23 to direct the web into an enclosure 24 having a large diameter steam pressure can 25 therein which serves to level out and eliminate surface irregularities in the primary carpet backing 49 prior to the application of a reactive foamable polyurethane composition thereto. The steam can 25 is customarily about 8 feet in diameter. In pulling the carpet web around the can 25, not only are the stitches and other primary backing defects and irregularities ironed out, but chemicals applied to the primary backing 49 and/or pile yarn during carpet finishing and dyeing are dissipated or neutralized.

Figure 2:
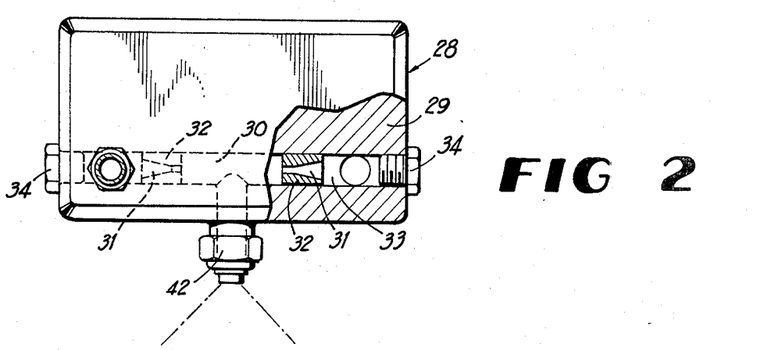
FIG. 2 is a front elevation, partly in cross section, of a mix and applicator head for a foamable composition.
Figure 3:
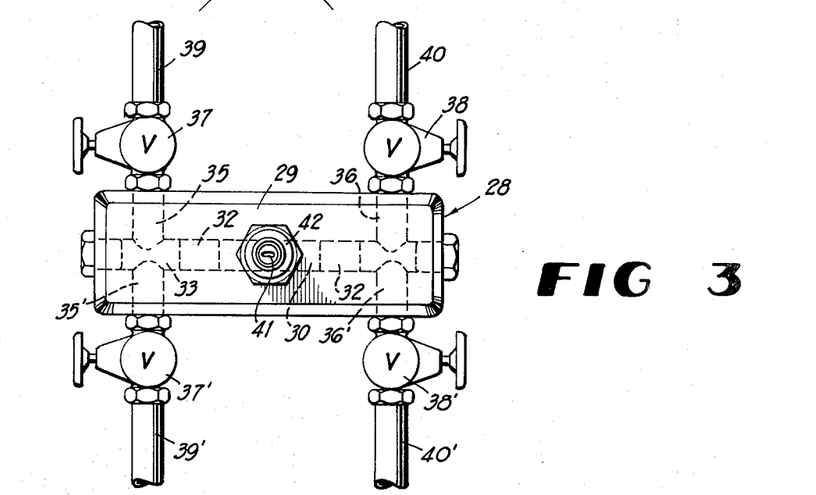
FIG. 3 is a partly schematic bottom plan view of the mix and applicator head shown in FIG. 2.

A first automatic web tension compensating roll 26 maintains a constant tension on the carpet web regardless of its weight as the web travels around the steam can 25. A second automatic tension compensating roll 27 assures a constant tension in the substrate or web as it passes toward and under a high pressure airless unitary mixing and spray applicator 28 for a reactant polyurethane mixture. The improved applicator 28 is a very important apparatus component in the invention and will be fully described. The applicator shown in detail in FIGS. 2 and 3 comprises a block or body 29 having a small internal mixing chamber 30 communicating with orifices 31 of threaded adjustable orifice plugs 32 held in a threaded bore 33 of the body 29. End closure plugs 34 for the bore 33 enables removal of the plugs 32 at required times. Outwardly of the plugs 32, a pair of right angular inlet passages 35 and 36 for two constituent parts of the reactant mixture intersect the bore 33 and open through one face of the block 29. External regulator valves 37 and 38 control the flow of the two mixture components, namely, the polyol and the diisocyanate components from inlet conduits 39 and 40 to the passages 35 and 36. The ratio of the two components admitted through the valves 37 and 38 is critical in the process and the best ratio is two parts of the polyol component to one part of the diisocyanate component.

The two mixture components, after passing through orifices 31 under high pressure in the range of 5 to 2000 psi, enter the small mixing chamber 30 and from this chamber pass to the spray aperture 41 of a nozzle 42 which communicates with the mixing chamber 30. The nozzle receives the reactive polyurethane composition in a thoroughly mixed pressurized state without the addition of air thereto. In the spray application of the reactive composition to the upwardly facing primary backing 49 of the carpet, the nozzle 42 is located a distance ranging from 12 to 60 inches above the primary backing. The carpet web travels on a horizontal path, FIG. 1A, beneath the spray applicator 28 while being supported on bed rollers 43.

The quantity of the reactant polyurethane mixture deposited on the carpet backing 49 is controlled by a number of factors including the operating pressure of the applicator 28, temperature of reactants, the size of its orifices 31 and of nozzle aperture 41, and the speed of movement of the carpet web as it passes under the applicator 28. Any required number of the applicators 28 can be employed in the apparatus depending upon the width of the carpet web 21.

In the described applicator 28, the polyol and diisocyanate ingredients do not comingle until they enter the small mixing chamber 30 immediately before being applied in a thoroughly mixed state to the carpet backing. The applicator 28 is airless, as stated so there is no mechanical foaming and the chemicals remain in the mixing chamber 30 so briefly that they do not begin foaming or thickening until after they exit the applicator 28. Because of this, the spray applicator is essentially non-clogging during use and this is a great improvement over the prior art applicators. Preferably, the two components of the reactant composition are temperature controlled to a temperature in the range of 30° F. to 200° F. when they enter the high pressure applicator 28 or plural applicators, as the case may be.

The applicator 28 is also equipped in its side away from the two inlet passages 35 and 36 with another pair of passages 35' and 36' for flushing connected with external regulator valves 37' and 38', in turn connected with flushing solvent inlet lines 39' and 40'. At proper times, the interior of the applicator can be thoroughly flushed out and during this operation, the orifice plugs 32 can be removed.

The two named components of the reactive polyurethane mix enter into an exothermic reaction producing carbon dioxide, thereby foaming or blowing the material to form a cellular layer. Conflicting objectives produce a problem with respect to the use of such reactant foams for carpet backings. One objective is a very short one or two minute dwell time in the curing oven, compared to the conventional 15 to 20 minutes in the prior art. The second objective is a long pot life which assures that the mixed composition will not begin to cure before it can be applied to the substrate. The problem of pot life versus dwell time is solved successfully in the present invention by mixing the ingredients in the small chamber 30 where there is no build up of the mixed materials and then immediately spraying the mixture onto the substrate while the latter is moving at a preestablished rate.

By using the heat generated in the exothermic reaction or by using this heat in combination with external heat in a curing oven, the curing of the applied polyurethane is accelerated, and with a small dwell time in the oven, the overall speed of the process is greatly increased over the prior art, up to a production rate of as much as 100 or more linear feet per minute, compared to 8 to 35 linear feet per minute with the water soluble latex process and a somewhat lesser production rate under prior art processes involving the direct application of a polyurethane composition with various smoothing techniques.

In the present invention, the formulation of the foamable reactive polyurethane composition is somewhat critical, as well as the ratio of its two main components as previously stated. In the following table, a preferred theoretical formula for the composition and a presently used formula in the practice of the method are set forth:

| Compound | Presently Used Formula | Theoretical Formula |
|---|---|---|
| Polyethylene glycol (m.wt. 5,000; OH No. 34) "ST 836 POLYOL" (Rheichhold Chem., White Plains, N.Y.) | 97 | 97 |
| Cross-linking amine "Q 700" (Brinmont Chem., Greensboro, N.C.) | 3 | 3 |
| Amine catalyst "NIAX-Al" Catalyst (Union Carbide, Atlanta, Georgia) | ½–1 | ½–1 |
| Dibutyl tin dilaurate "T12" Catalyst (Whitco Chem., Atlanta, Georgia) | ½–2 | ½–2 |
| Silicone surfactant "L 540 Silicone" (Union Carbide, Atlanta, Georgia) | ½–1 | ½–1 |
| Modified methylene diphenyl diisocyanate "143L MDI Isocyanate" (Upjohn Polymer Chem. Co., LaPort, Texas) | 40–50 | 70 |
| Color-on organic pigment (B&S Chem., Dalton, Georgia) | ½ Dry | ½ Dry |
| Water | 2½–4½ | 2 |

NOTE:
The numbers reflected in the above formulas are parts by weight.

While the above formula produces a resilient backing layer, the inventive concept disclosed herein of regauging of the applied composition can also be utilized with formulas that produce rigid end products rather than a flexible one as disclosed herein, as long as the regauging is done while the cells of the applied composition are in the tacky state.

Also the use of water or other agents as a detackifying substance has application in the production of rigid foam end products, since the use of water or another suitable detackifying agent will prevent the end product from sticking to the surface of the mold whether used with a stationary mold or a continuous molding process. By preventing the product from sticking to the mold surfaces, molding faults are greatly minimized.

As shown in FIGS. 1A and 1B, the entire spraying and curing zones of the apparatus are enclosed by a suitable housing 44 for safety. Preferably, a mist of water supplied by means, not shown, suppresses and settles out of the atmosphere in the housing 44 any airborne spray droplets and gases evolved during the reactant process which produces blowing of the polyurethane composition.

Following application of a layer 45 of the reactant mixture to the primary backing 49 of the carpet in a continuing manner, the carpet web with the applied backing layer passes over a high pressure steam box 46 located closely below the moving web and live wet steam is forced through the pile face of the carpet which is disposed lowermost. This application of steam to the carpet aids in controlling the reaction of the polyurethane components and promotes bonding of the backing layer 45 to the primary carpet backing during the blowing cycle which is already taking place in the region of the steam box 46.

Immediately following the application of live steam to the pile face of the moving carpet web, the same passes under a radiant preheating coil of a steam plate 47 arranged above the backing layer 45 to heat up the surface of the blowing or foaming polyurethane material and help eliminate surface tack thereon. Closely following this during the blowing cycle, the moving web passes under a quartz light radiant heat unit 48 to further reduce surface tack in the layer 45 late in the blow cycle. At this point in the process, the reactant layer 45 is substantially fully blown and the very early stage of the cure cycle for the backing layer is beginning. At this point in the process, the backing layer 45 is about to be introduced to a most important step or treatment in the process.

Figure 4:
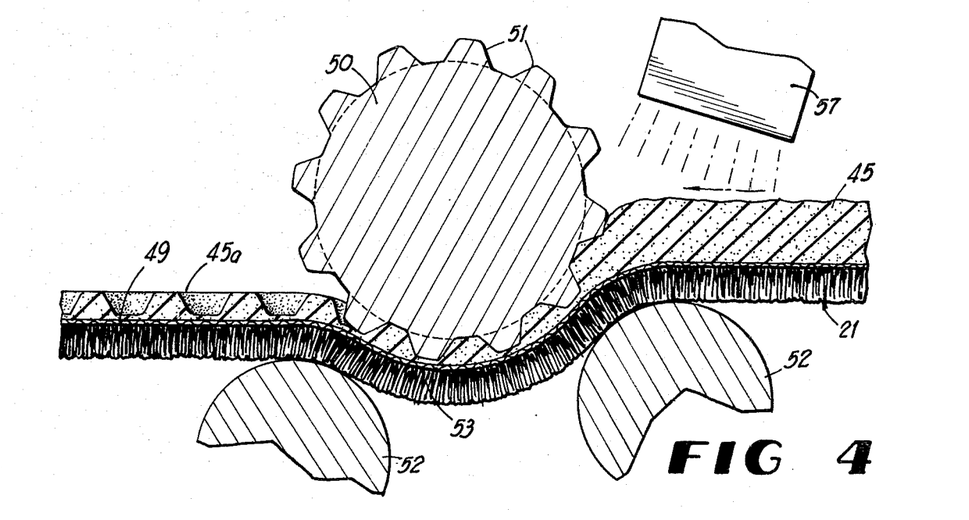
FIG. 4 is an enlarged fragmentary cross sectional view taken through a crushing or embossing roller and associated elements.
Figure 5:
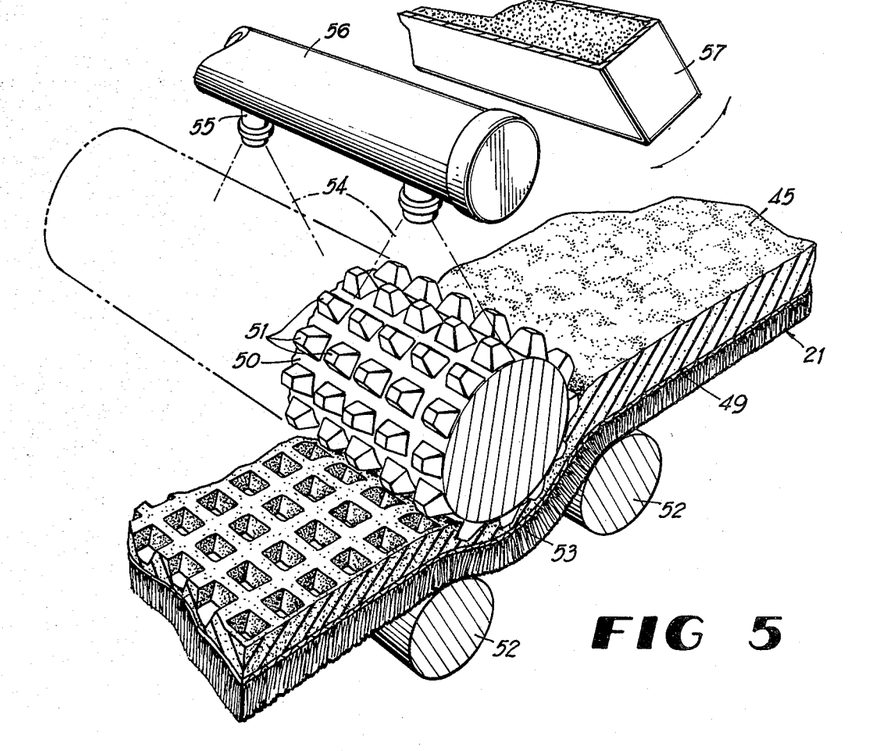
FIG. 5 is a fragmentary perspective view of the elements shown in FIG. 4 with the addition of a detackifying spray manifold.

As shown in FIGS. 1A, 4, 5 and 6 of the drawings, this important process step comprises regauging the fully blown and partially cured backing layer 45 to a new precise and highly uniform thickness or height on the primary backing 49 of the moving carpet web 21. As shown in FIGS. 1A, 4 and 5, this important regauging of the backing layer 45 can be accomplished by passing the carpet web under a regauging device 50 which may have surface projections 51 of the shape and size to impart a waffle pattern to the backing layer 45 while simultaneously compressing or crushing the backing layer to a new precise and uniform thickness indicated at 45a in FIG. 4. The waffle pattern imparted to the backing layer by the regauging roller 50 is clearly illustrated in FIGS. 4 and 5. In these figures, a pair of spaced carpet web supporting bed rolls 52 are provided on opposite sides of the vertical plane containing the axis of the regauging roller 50 such that their axes are parallel to the axis of the regauging roller 50 with one of the bed rolls 52 having its top surface positioned substantially above the low point of the regauging roller. This arrangement forms a taut depressed regauge loop portion 53 in the moving web so that the blown and partly cured backing layer will be subjected evenly to the full crushing effect of the regauging roller in the region of the loop 53.

Typically, the blown backing layer 45 before regauging may have an average thickness of ½ inch. The depth of the regauging roller projections 51 is typically ¼ inch measured from the tip of each projection to the cylindrical periphery of the roller 50. Thus, in the regauging process, the backing layer 45 is compressed or reduced down to approximately ¼ inch above the primary backing 49 and this dimension will be very constant and uniform in the finished product. To prevent adherence of the incompletely cured backing layer 45 to the regauging roller 50, heavy water sprays 54, FIG. 5, from spaced nozzles 55 of an overhead manifold 56 are directed on top of the regauging roller to form a liquid release barrier between the roller and the partly tacky polyurethane layer. The regauging roller 50 is preferably formed of steel which is chrome-plated.

In addition to the liberal application of water to the roller 50, a detackifying agent such as rubber crumb, certain mineral particles, fibrous material or variety of other agents may be applied liberally to the surface of the backing layer 45 immediately upstream from the regauging roller 50 and/or onto the roller 50 itself. A suitable applicator unit 57 for the flowable solid detackifying agent is provided in the apparatus near and above the moving web.

Figure 6:
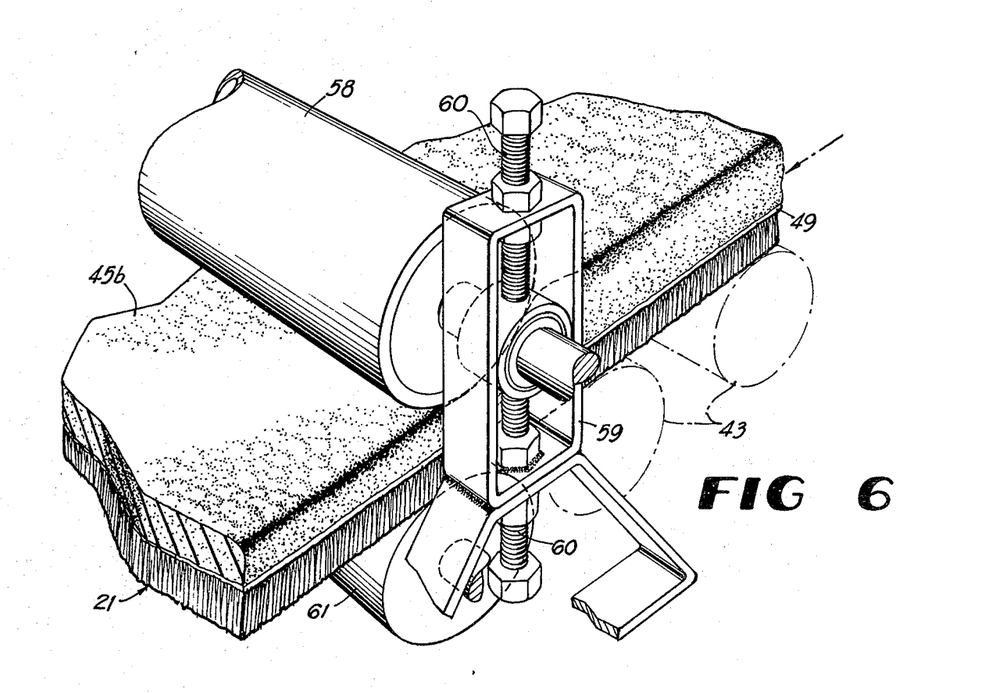
FIG. 6 is a perspective view, similar to FIG. 5, showing a smooth compression roll and adjusting means according to a variant of the invention.

Instead of the embossing roller 50 shown in FIGS. 4 and 5, a smooth cylindrical regauging roller 58, FIG. 6, may be employed for uniformly and precisely compressing the incompletely cured backing layer 45 to its new height 45b in accordance with the previous description except that the surface of the regauged backing layer 45b is smooth. As shown in FIG. 6, the regauging roller 58 may be adjustably held in a support structure 59 having screw-threaded adjusting means 60 whereby the thickness of the compressed or regauged backing layer 45 may be adjusted somewhat. In lieu of the spaced bed rollers 52, a single back-up roll 61 may be utilized as shown in FIG. 6 directly below and in opposition to the regauging roller 58. With this arrangement, the regauged loop 53 in FIG. 4 is eliminated and the traveling web is squeezed continuously through the nip of the two rollers 58 and 61 to compress the layer 45 to the new precise and very uniform height or thickness.

Figure 7:
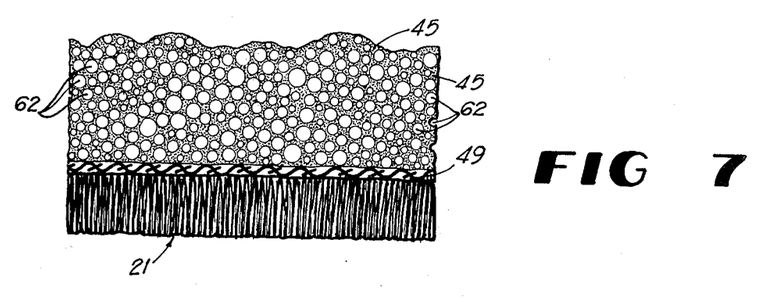
FIG. 7 is an enlarged fragmentary cross sectional view of a carpet having the foamed backing layer thereon prior to the compression thereof.
Figure 8:
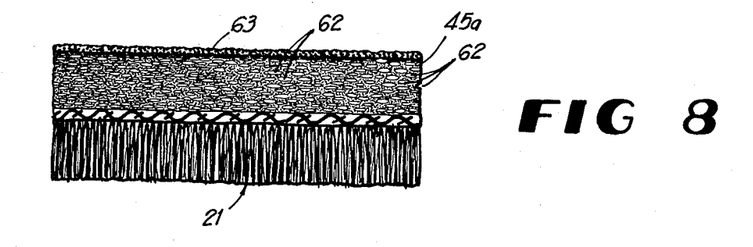
FIG. 8 is a similar cross sectional view of the product following the compression and complete curing of the foamed backing layer.

In either case, with the embossing roller 50 or smooth regauging roller 58, the same basic result in terms of the finished product is achieved. This result is graphically illustrated in FIGS. 7 and 8 of the drawings. FIG. 7 shows the cross section of the carpet web with the blown and incompletely cured polyurethane backing layer 45 thereon prior to the regauging process step. It should be stated that the regauging step will be equally effective whether the reactive composition is very evenly applied to the primary backing 49 or somewhat unevenly applied, as long as its average thickness is within pre-established limits. FIG. 8 shows a cross section of the final product after the described regauging of the layer 45 to form the reduced thickness layer 45a or 45b and after the completion of the cure cycle in the process. The internal cells 62, FIG. 7, formed in the blowing of the layer 45 have walls which are still tacky in the early stages of the cure cycle when the regauging operation takes place. With reference to FIG. 8, when the layer 45 is compressed to the reduced thickness shown at 45a, the cells 62 are distorted and their walls will adhere as graphically illustrated in FIG. 8 and the adherence will be permanent in the product following completion of the curing of the polyurethane backing and cushioning layer 45a. A comparatively thin smooth outer film or skin 63 formed of the applied detackifying agent or agents and the reactive components is produced on the regauged backing layer during the cure cycle.

It should be again emphasized that it is critical in the process to carry out the regauging step described in connection with FIG. 4 or 6 substantially at the end of the blow cycle and in the early stages of the cure cycle while the backing layer still contains a considerable degree of internal cell tackiness. If embossing procedures do not take place until very late in the cure cycle or after completion of the cure cycle, as in some of the prior art methods previously-discussed, it is impossible to accomplish the precision and uniform regauging of the cushion backing layer in accordance with this invention. If the regauging were to be attempted too early in the blow cycle, the reactive layer 45 would not only be too tacky but the blowing or foaming process would continue during and even after the regauging step, and thus would destroy the benefits of the precise regauging described herein.

It is thought to be vital in order to obtain the described results in the finished process to employ a regauging roller means of the kind described in conjunction with the improved high pressure airless spray applicator means 28.

Following the regauging operation, the continuously moving carpet web is advanced beyond the regauging roller 50, FIG. 1A, onto a tenter wing 64 where the carpet is stretched out to the desired width and held taut and flat during the remainder of the curing of the regauged backing layer 45a or 45b. This final curing takes place within a steam heated curing oven 65 equipped with a conventional tenter means 66. The curing oven drives any remaining moisture from the carpet pile or on the surface of the blown regauged backing layer. After emerging from the oven 65, the carpet web is handled in the same way as other cushion backed carpets. In the apparatus embodiment shown, the web is passed through a selvage edge trimmer 67 downstream from the oven 65 and then over a series of guide rollers 68 to a conventional carpet accumulator, not shown, where approximately 400 feet of the web is accumulated. From this point, the web moves along a lower run 69 through a final inspection station, not shown, to a variable speed roll-up mechanism 70 which is also conventional. The carpet web guidance system is electronically controlled.

While the disclosed apparatus includes the curing oven 65, it is possible to eliminate this oven from the system and to utilize the heat of the exothermic reaction inherent in the blowing of the reactive polyurethane mixture to accelerate the cure of the final backing and cushioning layer.

The end product embodied in the invention is unique and of greatly improved quality over the known prior art. The apparatus components employed in the method which produce the improved product effect a savings of energy consumed of more than ninety percent compared to processes utilizing water soluble latex. Additionally, the production rate under the invention is increased from the range of 8 to 35 linear feet per minute with latex to as much as 100 or more linear feet per minute. The resulting economic advantage is huge. Most importantly, the invention makes entirely practical and satisfactory for the first time the employment of a reactive polyurethane foamable composition applied directly to the primary backing of carpet or a similar substrate, by virtue of the high pressure airless spray applicator or other suitable method in combination with the regauging pressure roller means employed near the end of the blow cycle and/or early in the cure cycle. The many features and advantages of the invention should now be fully apparent to those skilled in the art.

Figure 9:
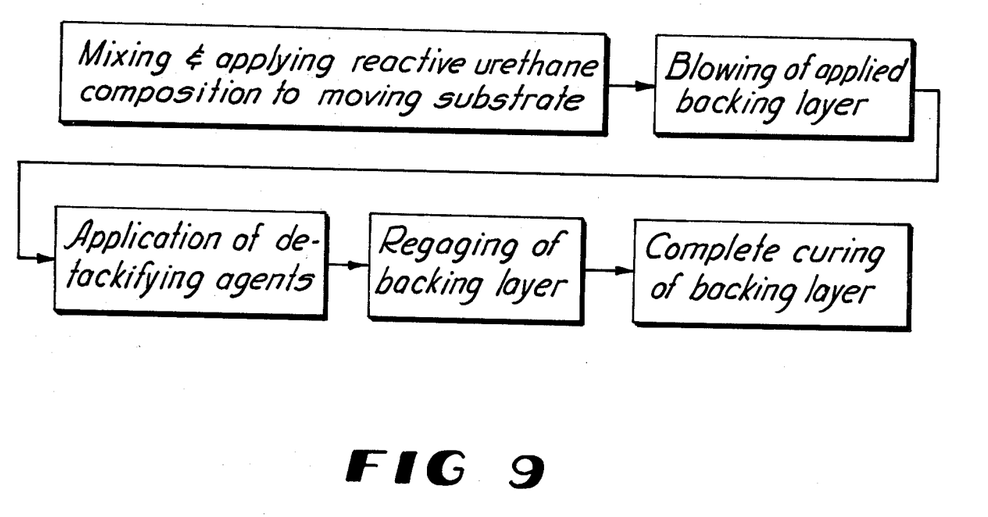
FIG. 9 is a flow diagram showing the essential novel method steps embodied in the invention.

The flow diagram in FIG. 9 contains the essential novel combination of method steps in the present invention. As shown in this flow diagram, from right to left, the traveling carpet web 21 with its primary backing 49 disposed upwardly transverses a mixing and applying station where the applicator 28 mixes approximately two parts of polyol compound with one part of diisocyanate compound under high pressure and without added air and applies the mixture to the primary backing 49 in spray form, as fully described. Beyond this mixing and composition applying station in the process, the carpet substrate continues to move through a zone where the applied layer of reactive polyurethane composition is blown or foamed, as indicated in FIG. 9. Substantially at the end of this zone, a detackifying agent or agents is applied to the substantially blown carpet backing layer by means of the described unit 57. At this point, the curing of the blown backing layer may be in its beginning stage. Immediately following this, the blown backing layer is subjected to regauging by the regauging means 50 and following regauging to a uniform thickness, the polyurethane backing layer has its curing completed.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. In a method of producing a cushion backing on a substrate, the steps of advancing a substrate and applying directly to one surface thereof an exothermically reactive foamable composition adapted to blow unconfined into a cellular layer on the substrate during a blowing cycle to a thickness greater than the final desired maximum thickness of the cellular layer, and regauging the blown cellular layer after the blowing cycle thereof and while the walls of the internal cells of said layer are tacky to thereby regauge the cellular layer to a permanently reduced and highly uniform thickness across the breadth of said substrate.

2. The method of claim 1, wherein the substrate is flexible.

3. The method of claim 2, and the flexible substrate comprising a web of carpet having a primary backing.

4. The method of claim 1, and said exothermically reactive foamable composition comprising a polyurethane composition which blows in the formation of said cellular layer.

5. The method of claim 4, and said polyurethane composition comprising at least polyol and diisocyanate.

6. The method of claim 5, and said polyurethane composition comprising substantially two parts polyol to one part diisocyanate.

7. The method of claim 1, and said compressing comprising acting on the blown cellular layer with a mechanical regauging device during said advancing of the substrate.

8. The method of claim 1, and said compressing comprising acting on the blown cellular layer with a smooth surface regauging device during said advancing of the substrate.

9. The method of claim 1, and said compressing comprising acting on the blown cellular layer with a textured regauging device during said advancing of the substrate.

10. The method of claim 1, and applying a detackifying agent to the blown cellular layer prior to compressing it.

11. The method of claim 10, and said detackifying agent comprising at least one solid.

12. The method of claim 10, and said detackifying agent comprising at least one liquid.

13. The method of claim 7, and applying liquid between the regauging device and the foam surface interface prior to compressing.

14. The method of claim 4, and the curing of the regauged cellular layer at least in part with the heat of reaction of said exothermically reactive foamable composition.

15. The method of claim 10, and preheating the blown cellular layer prior to compressing it to reduce the surface tackiness of said layer.

16. The method of claim 15, and said flexible substrate comprising a web of carpet, and applying steam to the pile face of the web of carpet prior to compressing said blown cellular layer.

17. A method of producing a cushion backing on a carpet substrate comprising mixing substantially polyol with diisocyanate to create a reactive foamable polyurethane composition, applying said reactive foamable polyurethane composition directly to the primary backing of the carpet substrate, allowing said reactive foamable polyurethane composition to blow unconfined into a cellular backing layer having a thickness greater than the desired maximum thickness of the cellular backing layer, regauging said cellular backing layer by means of a regauging device at the end of the blowing cycle of such layer to obtain a uniform reduced thickness of the backing layer across the breadth of said substrate, and completing the curing of the backing layer subsequent to said regauging.

18. The method of claim 17 and applying a detackifying agent to the surface of the blown cellular backing layer prior to regauging.

19. The method of claim 17 and wherein said reactive foamable polyurethane composition is applied by means of a high pressure airless applicator.

20. The method of claim 4, and applying heat to the regauged cellular layer from an external source during said advancing of said substrate.

21. Apparatus for producing a cushion backing on a moving flexible substrate comprising means to support and advance the substrate, means for directly applying a foamable reactive polyurethane composition onto the moving substrate to form by unconfined blowing a cellular polyurethane backing layer having a thickness greater than the maximum desired thickness of the backing layer, said applying means being spaced from one surface of the moving substrate, and a regauging means substantially downstream from said polyurethane applying means and adapted to regauge substantially the applied polyurethane backing layer after the blowing cycle and before complete curing thereof on said substrate to a permanently reduced thickness.

22. Apparatus for producing a cushion backing as defined in claim 21, and means adjacent to said regauging means to apply a detackifying agent onto the interface between the regauging means and the surface of said backing layer.

23. Apparatus for producing a cushion backing as defined in claim 22, and said detackifying applying means comprising a water applicator means and an adjacent applicator for a flowable detackifying agent.

24. Apparatus for producing a cushion backing as defined in claim 21, wherein said substrate is a carpet web having a primary backing and a pile surface with the primary backing facing said polyurethane applying means and regauging means, preheating means spaced from said primary backing and arranged between said polyurethane applying means and said regauging means, and a live steam applicator spaced from and facing said pile surface and disposed between said polyurethane applying means and said regauging means.

25. Apparatus for producing a cushion backing as defined in claim 21, and said regauging means comprising a smooth cylindrical regauging roller spanning said substrate transversely of its path of movement, and a back-up roller on the far side of the substrate diametrically opposite the regauging roller, and means to adjust the nip between the regauging and back-up rollers.

26. Apparatus for producing a cushion backing as defined in claim 21, and said regauging means comprising a design configuration roller extending transversely of the moving substrate, and bed roller means for the substrate on the far side thereof and being spaced on opposite sides of the axis of the design configuration roller.

27. Apparatus for producing cushion backing as defined in claim 21, and a curing oven for said backing layer downstream from the regauging means.

28. Apparatus for producing a cushion backing on a moving flexible substrate comprising means to support and advance the substrate, means for directly applying an exothermic reactive foamable composition onto the moving substrate to form by unconfined blowing a cellular backing layer having a thickness greater than the maximum desired thickness of the backing layer, said applying means being spaced from one surface of the moving substrate, and a regauging means substantially downstream from said foamable composition applying means and adapted to regauge substantially the applied exothermic reactive foamable backing layer after the blowing cycle and before complete curing thereof on said substrate to a permanently reduced thickness.

* * * * *